United States Patent
Nomura et al.

(10) Patent No.: US 11,882,122 B2
(45) Date of Patent: Jan. 23, 2024

(54) PREPARATION DEVICE, PREPARATION SYSTEM, PREPARATION METHOD, AND PREPARATION PROGRAM

(71) Applicant: NIPPON TELEGRAPH AND TELEPHONE CORPORATION, Tokyo (JP)

(72) Inventors: Koki Nomura, Musashino (JP); Yukio Nagafuchi, Musashino (JP); Iifan Tyou, Musashino (JP); Tetsuhiko Murata, Musashino (JP); Koji Morishita, Musashino (JP); Kenji Ota, Musashino (JP); Akio Mukaiyama, Musashino (JP); Takahiro Nukushina, Musashino (JP); Hiroki Nagayama, Musashino (JP); Masaki Tanikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 229 days.

(21) Appl. No.: 17/425,325

(22) PCT Filed: Jan. 27, 2020

(86) PCT No.: PCT/JP2020/002743
§ 371 (c)(1),
(2) Date: Jul. 23, 2021

(87) PCT Pub. No.: WO2020/166311
PCT Pub. Date: Aug. 20, 2020

(65) Prior Publication Data
US 2022/0094687 A1   Mar. 24, 2022

(30) Foreign Application Priority Data

Feb. 12, 2019   (JP) .................... 2019-023052

(51) Int. Cl.
 H04L 45/02   (2022.01)
 H04L 9/40   (2022.01)

(52) U.S. Cl.
 CPC ........ H04L 63/101 (2013.01); H04L 63/0227 (2013.01)

(58) Field of Classification Search
 CPC ...................... H04L 63/101; H04L 63/0227
 See application file for complete search history.

(56) References Cited

U.S. PATENT DOCUMENTS

| 10,728,250 B2 * | 7/2020 | Bartik | .................... H04L 63/101 |
| 10,887,351 B2 * | 1/2021 | Nanda | .................... G06F 21/606 |

(Continued)

FOREIGN PATENT DOCUMENTS

| CN | 108718320 A | 10/2018 |
| JP | 2019-9680 A | 1/2019 |
| WO | 2019/168191 A1 | 9/2019 |

OTHER PUBLICATIONS

Kouki Nomura, Yukio Nagafuchi, Masaki Tanikawa; A proposal of a method for providing provisional whitelistduring machine learning period of whitelist for IoT-GW.NTT Secure Platform Laboratories NTT Corporation; p. 449-450. (Year: 2018).*

(Continued)

*Primary Examiner* — Yonas A Bayou
(74) *Attorney, Agent, or Firm* — XSENSUS LLP

(57) ABSTRACT

A creation device includes processing circuitry configured to collect pieces of information about IoT (Internet of Things) apparatuses connected to IoT gateways, and white lists stored in the IoT gateways, the white lists specifying content of communication allowed for each of the IoT apparatuses, calculate a feature value showing communication features of IoT apparatuses for each of the IoT gateways, and degrees of similarity in the feature value among the IoT gateways, based on the collected pieces of information about the IoT (Continued)

apparatuses, and extract, if any of the calculated similarity degrees is equal to or above a predetermined threshold, pieces of white list information about IoT apparatuses to mutually complement white lists stored in IoT gateways, from pieces of white list information about IoT apparatuses included in the white lists.

6 Claims, 7 Drawing Sheets

(56) References Cited

U.S. PATENT DOCUMENTS

| | | | |
|---|---|---|---|
| 11,032,302 B2* | 6/2021 | Garcia | H04L 63/1408 |
| 2012/0023593 A1* | 1/2012 | Puder | H04L 63/101 |
| | | | 726/28 |
| 2015/0135253 A1* | 5/2015 | Angel | H04L 63/0254 |
| | | | 726/1 |
| 2017/0180208 A1* | 6/2017 | Smith | H04L 41/5054 |
| 2018/0351955 A1* | 12/2018 | Wang | H04L 63/101 |
| 2019/0036930 A1* | 1/2019 | Bartik | G06F 21/577 |
| 2019/0036954 A1* | 1/2019 | Garcia | H04L 63/20 |
| 2019/0342339 A1* | 11/2019 | Nanda | G06F 21/62 |
| 2020/0036682 A1* | 1/2020 | Honma | H04L 63/101 |
| 2020/0374290 A1* | 11/2020 | Nomura | H04L 12/66 |
| 2020/0389459 A1* | 12/2020 | Girardi | H04W 12/66 |

OTHER PUBLICATIONS

Nec, "Edge Gateway", Available Online At: http://jpn.nec.com/iot/platform/egw/index.html, Feb. 2, 2018, 6 pages including English Translation.

Nomura et al., "Method for Providing Provisional Whitelist in IoT-GW Whitelist Machine Learning Period", 80th National Convention of IPSJ, Mar. 13, 2018, pp. 449-450 (8 pages including English Translation.).

* cited by examiner

PREPARATION DEVICE, PREPARATION SYSTEM, PREPARATION METHOD, AND PREPARATION PROGRAM

CROSS-REFERENCE TO RELATED APPLICATIONS

The present application is based on PCT filing PCT/JP2020/002743, filed Jan. 27, 2020, which claims priority to JP 2019-023052, filed Feb. 12, 2019, the entire contents of each are incorporated herein by reference.

TECHNICAL FIELD

The present invention relates to a creation device, a creation system, a creation method and a creation program.

BACKGROUND ART

An IoT (Internet of Things) gateway to connect apparatuses such as cameras and temperature/humidity sensors to a communication network as IoT apparatuses is known (see Non-Patent Literature 1). Since an IoT apparatus has fewer resources in comparison with a personal computer, there may be a case where it is difficult to introduce security measure software.

Therefore, as security measures for the IoT apparatuses, access control is performed in which, by applying a white list in which allowed communications are listed up to the IoT gateway, access is disabled for communications that are not in the white list.

CITATION LIST

Non-Patent Literature

Non-Patent Literature 1: "Edge Gateway", [online], NEC, [retrieved on Feb. 2, 2018], the Internet <URL:http://jpn.nec.com/iot/platform/egw/index.html>

SUMMARY OF THE INVENTION

Technical Problem

However, there is a problem that it takes much time to create a white list to be applied to an IoT gateway. In general, machine learning is effective for creation of a white list. However, there may be a case where a period of a few days is required to create a white list by machine learning. Since there is a possibility that an IoT apparatus accesses a dangerous site even during the period of white list creation by machine learning, security measures are essential.

The present invention has been made in view of the above, and an object is to quickly create a white list to be applied to an IoT gateway, suppressing a capacity.

Means for Solving the Problem

In order to solve the problem described above and achieve the object, a creation device according to the present invention includes: processing circuitry configured to: collect pieces of information about IoT (Internet of Things) apparatuses connected to IoT gateways, and white lists stored in the IoT gateways, the white lists specifying content of communication allowed for each of the IoT apparatuses; calculate a feature value showing communication features of IoT apparatuses for each of the IoT gateways, and degrees of similarity in the feature value among the IoT gateways, based on the collected pieces of information about the IoT apparatuses; and extract, if any of the calculated similarity degrees is equal to or above a predetermined threshold, pieces of white list information about IoT apparatuses to mutually complement white lists stored in IoT gateways, from pieces of white list information about IoT apparatuses included in the white lists.

Effects of the Invention

According to the present invention, it is possible to quickly create a white list to be applied to an IoT gateway, suppressing a capacity.

DESCRIPTION OF EMBODIMENTS

An embodiment of the present invention will be described below in detail with reference to drawings. Note that the present invention is not limited by the embodiment. In the diagrams, the same portions are shown, being given the same reference sign.

Figure 1:
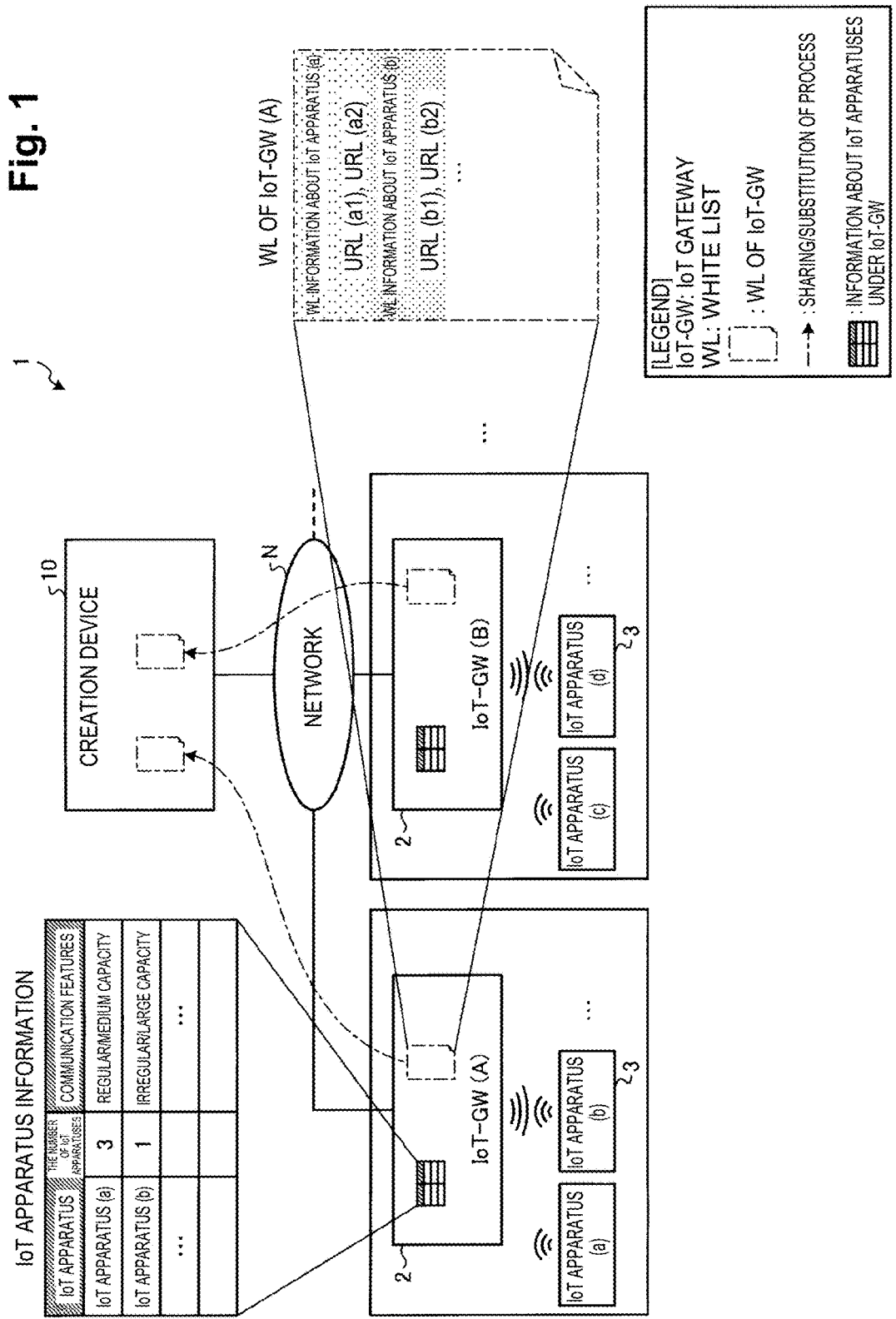
FIG. 1 is a schematic diagram illustrating an overview configuration of a creation system according to the present embodiment.

[Configuration of creation system] FIG. 1 is a schematic diagram illustrating an outline configuration of a creation system according to the present embodiment. As illustrated in FIG. 1, a creation system 1 has IoT gateways 2 and a creation device 10. IoT apparatuses 3 are apparatuses that are usually not connected to a network N, for example, cameras, sensors or the like and are connected to the IoT gateways 2 via Bluetooth (registered trademark), wireless LAN or the like.

The IoT gateways 2 are network devices that connect IoT apparatuses 3 under the IoT gateways 2 to the network N and are realized by NPs (network processors), FPGA (field programmable gateway arrays) or the like.

Each of the IoT gateways 2 periodically collects pieces of information about IoT apparatuses 3 under the IoT gateway 2. For example, as illustrated in FIG. 1, each IoT gateway 2 collects models of the IoT apparatuses 3, the number of IoT apparatuses 3 for each model, and features of communication with the IoT gateway 2.

In the present embodiment, the communication features are indicated by a combination of communication frequency and communication capacity or the like. For example, the communication frequency is indicated by any of "regular" and "irregular". The communication capacity is indicated by any of "large capacity", "medium capacity" and "small capacity".

In FIG. 1, it is illustrated that three IoT apparatuses (a) are connected under IoT-GW (A), and communication features of the IoT apparatuses (a) are "regular/medium capacity". Further, it is illustrated that one IoT apparatus (b) is connected under IoT-GW (A), and communication features of the IoT apparatus (b) are "irregular/large capacity".

Each of the IoT gateways 2 stores a white list. The white list is information specifying content of allowed communication, such as accessible sites, for each of models of the IoT apparatus 3 under the IoT gateway 2. The white list of each IoT gateway 2 is a set of pieces of white list information about the IoT apparatuses 3 under the IoT gateway 2.

In the example shown in FIG. 1, it is illustrated that a white list of IoT-GW (A) includes pieces of white list information about the IoT apparatuses (a) and the IoT apparatus (b) under IoT-GW (A). Further, in FIG. 1, it is illustrated that the white list information about the IoT apparatuses (a) is such that allows access to URL (a1) and URL (a2). Further, in FIG. 1, it is illustrated that the white list information about the IoT apparatus (b) is such that allows access to URL (b1) and URL (b2).

The creation device 10 causes such IoT gateways 2 that communication features of IoT apparatuses 3 under the IoT gateways 2 are similar, among all the IoT gateways 2 connected to the network N, to share pieces of white list information about the IoT apparatuses 3. Thereby, it becomes possible to apply, to each of the IoT gateways 2, the latest white list that includes only pieces of white list information about IoT apparatuses 3 that are highly likely to be connected to the IoT gateway 2.

Figure 2:
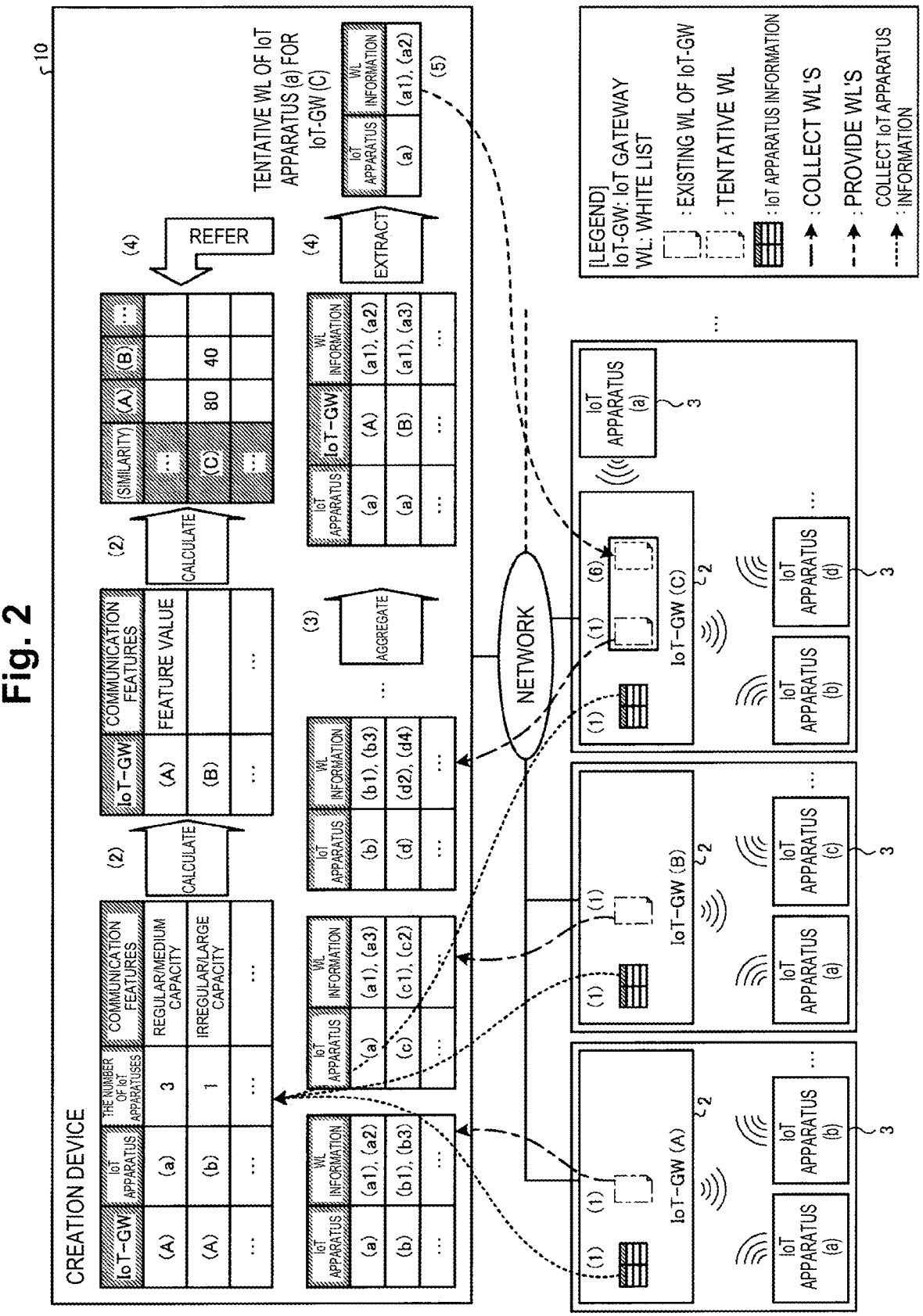
FIG. 2 is a diagram for explaining a process overview of a creation device according to the present embodiment.

Here, FIG. 2 is an explanatory diagram for explaining a process overview of the creation system 1 according to the present embodiment. As illustrated in FIG. 2, in the creation system 1, the creation device 10 collects existing white lists stored in the IoT gateways 2 and pieces of IoT apparatus information about IoT apparatuses under the IoT gateways 2 (step (1)).

Specifically, the creation device 10 collects, as the IoT apparatus information about the IoT apparatuses under each of the IoT gateways 2, models of the IoT apparatuses 3, the number of IoT apparatuses 3 for each model and features of communication with the IoT gateway 2.

Then, the creation device 10 calculates, for each of the IoT gateways 2, a feature value showing communication features of IoT apparatuses 3 under the IoT gateway 2, and calculates degrees of similarity in the feature value among the IoT gateways 2 (step (2)).

Further, for each of the IoT gateways 2 and each of the IoT apparatuses 3, the creation device 10 aggregates white list information (step (3)). Then, the creation device 10 refers to degrees of similarity among the IoT gateways 2 and, if any of the similarity degrees is equal to or above a threshold, extracts pieces of white list information about IoT apparatuses 3 to complement white lists of the IoT gateways, to prepare tentative white lists (steps (4) to (5)).

In the example shown in FIG. 2, it is assumed that, if a degree of similarity is 60% or above, feature values of IoT gateways 2 are similar. In order that pieces of white list information of desired IoT apparatuses 3 become the same among similar IoT gateways 2, the creation device 10 creates a tentative white list for each of the IoT gateways 2. In other words, the tentative white list is a set of pieces of white list information about IoT apparatuses 3 for complementing an existing white list of each of the IoT gateways 2.

In the example shown in FIG. 2, a tentative white list is created so that pieces of white list information about desired IoT apparatuses 3 are the same between IoT-GW (A) and IoT-GW (C). For example, for IoT-GW (C), a tentative white list that includes the white list information about the IoT apparatus (a) is created to complement an existing white list.

In each of the IoT gateways 2, an existing white list and a tentative white list are applied as the latest white list (step (6)). Thereby, it is possible to share a white list among IoT gateways 2 with a high degree of similarity. In each of the IoT gateways 2, it becomes possible to perform access control for a new IoT apparatus 3 using the tentative white list. In the example shown in FIG. 2, in IoT-GW (C), it is possible to perform access control of a new IoT apparatus (a) by the tentative white list.

Further, the creation device 10 can create, for each of the IoT gateways 2, a tentative white list, excluding pieces of white information about IoT apparatuses 3 that are unlikely to be connected to the IoT gateways 2. In the example shown in FIG. 2, a white list is not shared with IoT-GW (B) with a low degree of similarity with IoT-GW (C). For example, though white list information about an IoT apparatus (c) is also included in a white list of IoT-GW (B), it is included in neither the existing white list nor tentative white list of IoT-GW (C). Thereby, it becomes possible for the creation device 10 to create a tentative white list, suppressing a capacity.

Figure 3:
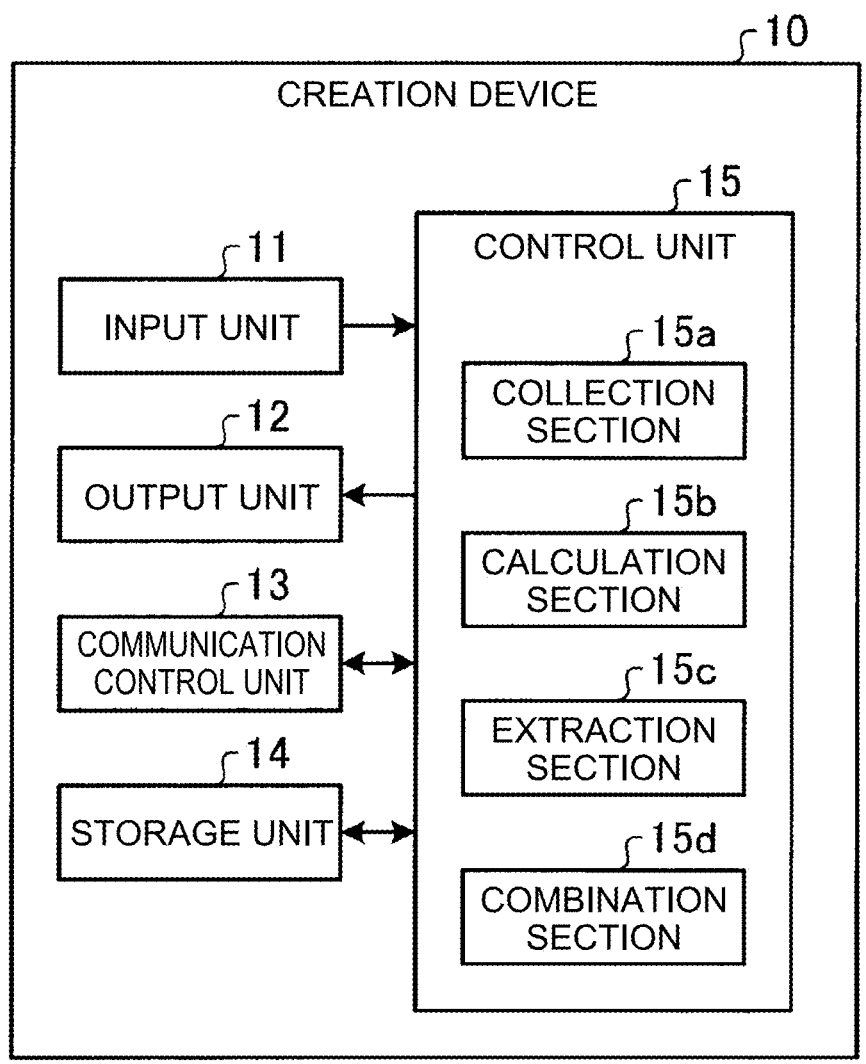
FIG. 3 is a schematic diagram illustrating an outline configuration of the creation device.

[Configuration of creation device] FIG. 3 is a schematic diagram illustrating an outline configuration of the creation device 10. As illustrated in FIG. 3, the creation device 10 is realized by a general-purpose computer such as a personal computer and is provided with an input unit 11, an output unit 12, a communication control unit 13, a storage unit 14 and a control unit 15.

The input unit 11 is realized by input devices such as a keyboard and a mouse, and the input unit 11 inputs various kinds of pieces of instruction information such as start of a process, to the control unit 15 in response to an input operation by an operator. The output unit 12 is realized by a display device such as a liquid crystal display, a printing device such as a printer, and the like.

The communication control unit 13 is realized by an NIC (network interface card) or the like and controls communication between external devices such as the IoT gateways 2 and the control unit 15 via a telecommunication line such as a LAN (local area network) and the Internet.

The storage unit 14 is realized by a semiconductor memory element, such as a RAM (random access memory) and a flash memory, or a storage device such as a hard disk and an optical disk. In the storage unit 14, a processing program to cause the creation device 10 to operate, and data and the like used during execution of the processing program are stored in advance, or temporarily stored each time a process is performed. For example, pieces of IoT apparatus information, white lists and the like collected from the IoT gateways 2 in a creation process described later are stored in the storage unit 14. Note that the storage unit 14 may be configured to communicate with the control unit 15 via the communication control unit 13.

Figure 4:
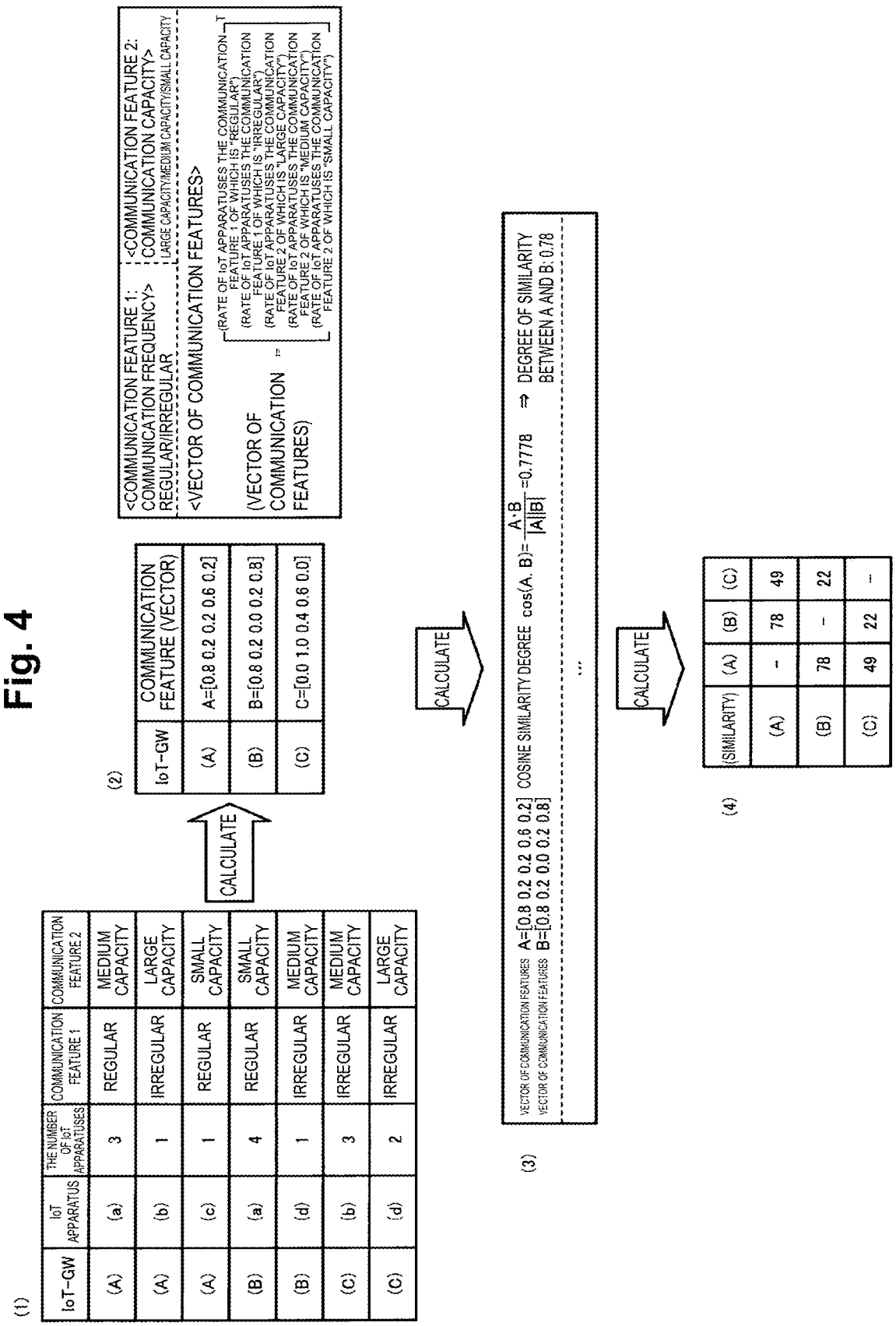
FIG. 4 is a diagram for explaining a process of a calculation section.

The control unit 15 is realized by a CPU (central processing unit) or the like and executes the processing program stored in the memory. Thereby, the control unit 15 functions as a collection section 15*a*, a calculation section 15*b*, an extraction section 15*c* and a combination section 15*d* as illustrated in FIG. 4. Note that each of or a part of these functional units may be implemented in different hardware. For example, the combination section 15*d* may be implemented in the IoT gateways 2.

The collection section 15a collects pieces of information about the IoT apparatuses 3 connected to the IoT gateways 2, and white lists stored in the IoT gateways 2, the white lists specifying content of communication allowed for each of the IoT apparatuses 3. Specifically, the collection section 15a collects, from all the IoT gateways 2 connected to the network N, pieces of IoT apparatus information that the IoT gateways 2 regularly collect and existing white lists stored in the IoT gateways 2.

In the example shown in FIG. 2, the collection section 15a collects, from IoT-GW (A), IoT apparatus information including the number of IoT apparatuses 3 for each model and communication features, about IoT apparatuses 3 under IoT-GW (A) such as the IoT apparatus (a) and the IoT apparatus (b). Further, the collection section 15a collects, from IoT-GW (B), IoT apparatus information including the number of IoT apparatuses 3 for each model and communication features, about IoT apparatuses 3 under IoT-GW (B), such as the IoT apparatus (a) and the IoT apparatus (c).

Then, the collection section 15a aggregates the pieces of IoT apparatus information collected from the IoT gateways 2, for each IoT gateway 2 and each IoT apparatus 3. In the example shown in FIG. 2, it is shown that, for example, three IoT apparatuses (a) the communication features of which are "regular/medium capacity" exist under IoT-GW (A).

Further, the collection section 15a collects, from IoT-GW (A), a white list that includes white list information that allows the IoT apparatus (a) to access URL (a1) and URL (a2), white list information that allows the IoT apparatus (b) to access URL (b1) and URL (b3) and the like. Further, the collection section 15a collects, from IoT-GW (B), a white list that includes white list information that allows the IoT apparatus (a) to access URL (a1) and URL (a3), white list information that allows the IoT apparatus (c) to access URL (c1) and URL (c2) and the like.

Returning to the description of FIG. 3, the calculation section 15b calculates a feature value showing communication features of IoT apparatuses 3 for each of the IoT gateways 2, and degrees of similarity in the feature value among the IoT gateways 2, based on the collected pieces of information about the IoT apparatuses 3.

For example, the calculation section 15b calculates, for each IoT gateway 2, the feature value based on the number of IoT apparatuses 3 for each model and communication features for the model. Further, the calculation section 15b calculates the feature value, for example, based on the number of IoT apparatuses 3, communication frequency and capacity for each model.

Here, FIG. 4 is a diagram for explaining a process of the calculation section 15b. In the example shown in FIG. 4, the calculation section 15b calculates a vector of communication features as the feature value, using a rate of the number of IoT apparatuses 3 under each IoT gateway 2 for each communication feature.

Specifically, first, the calculation section 15b aggregates pieces of IoT apparatus information collected by the collection section 15a for each IoT gateway 2 and each IoT apparatus 3 as shown in FIG. 4 (1). In the example shown in FIG. 4, communication features of each IoT apparatus 3 are indicated by a combination of a communication feature 1 and a communication feature 2. The communication feature 1 is communication frequency and is indicated by either "regular" or "irregular". The communication feature 2 is a communication capacity and is indicated by any of "large capacity", "medium capacity" and "small capacity". For example, in FIG. 4 (1), it is shown that three IoT apparatuses (a) with the communication feature 1 of "regular" and the communication feature 2 of "medium capacity" exist under IoT-GW (A).

Then, the calculation section 15b calculates a communication feature vector for each of the IoT gateways 2 as shown in FIG. 4 (2). In the example shown in FIG. 4, the communication feature vector is a vector with a rate of the number of IoT apparatuses 3 for each communication feature in the IoT gateway 2 as an element.

For example, the first element of the communication feature vector indicates a rate of IoT apparatuses 3 the communication feature 1 of which is "regular" in each IoT gateway 2. In the example shown in FIG. 4 (2), the first element of a communication feature vector A for IoT-GW (A) is calculated as 0.8 because there are four IoT apparatuses 3 the communication feature 1 of which is "regular" among five IoT apparatuses 3 under IoT-GW (A).

The fifth element of the communication feature vector indicates a rate of IoT apparatuses 3 the communication feature 2 of which is "small capacity" in each IoT gateway 2. In the example shown in FIG. 4 (2), the fifth element of the communication feature vector A for IoT-GW (A) is calculated as 0.2 because there is one IoT apparatus 3 the communication feature 2 of which is "small capacity" among the five IoT apparatuses 3 under IoT-GW (A).

Next, the calculation section 15b calculates degrees of similarity in the communication feature vector among the IoT gateways 2 as shown in FIGS. 4 (3) and (4). A method for calculating the similarity degrees is not especially limited, and the calculation section 15b calculates, for example, cosine similarity degrees, generalized Jaccard similarity degrees or the like among vectors. The calculation section 15b may calculate an average value of similarity degrees by a plurality of calculation methods as the similarity degree. In the example shown in FIG. 4 (3), the calculation section 15b calculates a degree of cosine similarity between vectors as the similarity degree. Then, the calculation section 15b calculates the degrees of similarity in the communication feature vector among the IoT gateways 2 as shown in FIG. 4 (4).

Returning to the description of FIG. 3, if any of the calculated similarity degrees is equal to or above a predetermined threshold, the extraction section 15c extracts, from pieces of white list information about IoT apparatuses 3 included in the white lists stored in the IoT gateways 2, pieces of white list information about IoT apparatuses 3 to mutually complement white lists. Further, the extraction section 15c creates tentative white lists to be applied to the IoT gateways 2 using the extracted pieces of white list information.

Figure 5:
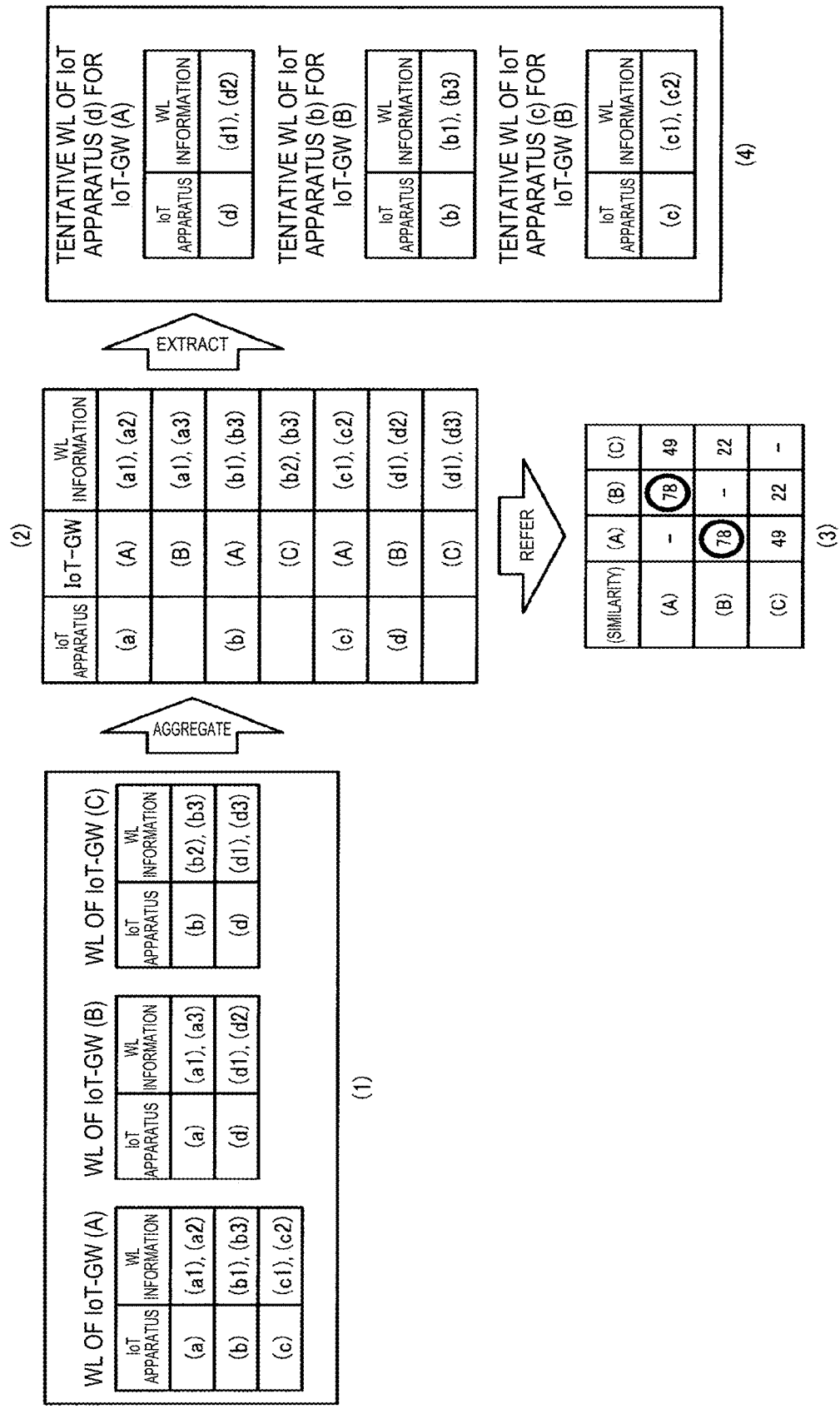
FIG. 5 is a diagram for explaining a process of an extraction section.

Here, FIG. 5 is a diagram for explaining a process of the extraction section 15c. In the example of FIG. 5, the extraction section 15c targets a combination of IoT gateways 2 with a similarity degree of 60% or more. Then, in order that pieces of white list information about desired IoT apparatuses 3 become the same between the target IoT gateways 2, the extraction section 15c creates a tentative white list to complement an existing white list of each of the IoT gateways 2.

For example, the extraction section 15c aggregates existing white lists of the IoT gateways 2 collected by the collection section 15a, which are illustrated in FIG. 5 (1), for each IoT apparatus 3 as shown in FIG. 5 (2). Then, referring to degrees of similarity among the IoT gateways 2 calculated by the calculation section 15b, which are illustrated in FIG. 5 (3), the extraction section 15c selects a combination of IoT gateways 2 with a similarity degree of 60% or more. In the example shown in FIG. 5 (3), since a degree of similarity of a combination of IoT-GW (A) and IoT-GW (B) is 78%, the combination is selected as mutually similar IoT gateways 2.

Then, in order that pieces of white list information of desired IoT apparatuses 3 become the same between the similar IoT gateways 2, the extraction section 15c extracts pieces of white list information about IoT apparatus 3 to mutually complement each other. In the example shown in FIG. 5 (4), for example, white list information about the IoT apparatus (b) that is included in an existing white list of IoT-GW (A) but is not included in an existing white list of IoT-GW (B) is extracted for IoT-GW (B). Here, white list information that allows the IoT apparatus (b) that currently functions not in other gateways but in IoT-GW (A) to access to URL (b1) and URL (b3) is extracted.

Similarly, white list information about the IoT apparatus (c) is extracted for IoT-GW (B). In this way, the white list information about the IoT apparatus (b) and the white list information about the IoT apparatus (c) are extracted for IoT-GW (B). The extraction section 15c creates a tentative white list that includes the white list information about the IoT apparatus (b) and the white list information about the IoT apparatus (c), for IoT-GW (B).

Returning to the description of FIG. 3, the combination section 15d combines the extracted pieces of white list information with the white lists stored in the IoT gateways 2. Specifically, the combination section 15d combines the tentative white lists created using the extracted pieces of white list information with the white lists stored in each IoT gateway 2 to create white lists to be applied to the IoT gateways 2.

In other words, the combination section 15d combines an existing white list of each IoT gateway 2 with a tentative white list created by the extraction section 15c to create the latest white list to be applied to the IoT gateway 2. Each IoT gateway 2 applies the existing white list to existing IoT apparatuses 3 and applies the tentative white list to a new IoT apparatus 3.

For example, in the example shown in FIG. 5, IoT-GW (B) performs access control for the IoT apparatus (a) and an IoT apparatus (d) with the existing white list. Further, IoT-GW (B) performs access control for a new IoT apparatus (b) and IoT apparatus (c) with the tentative white list.

Similarly, IoT-GW (A) performs access control for the IoT apparatus (a), the IoT apparatus (b) and the IoT apparatus (c) with the existing white list. Further, IoT-GW (A) performs access control for a new IoT apparatus (d) with the tentative white list.

Thus, it is possible to share a white list among similar IoT gateways 2 by the creation device 10. In each IoT gateway 2, it becomes possible to perform access control for a new IoT apparatus 3 using a tentative white list. Further, a tentative white list with a suppressed capacity, from which pieces of white information about IoT apparatuses 3 that are unlikely to be connected to each IoT gateway 2 is excluded, is created.

Note that the combination section 15d may be implemented in each IoT gateway 2. In that case, the creation device 10 distributes a tentative white list created by the extraction section 15c, to each IoT gateway 2 via the communication control unit 13.

Figure 6:
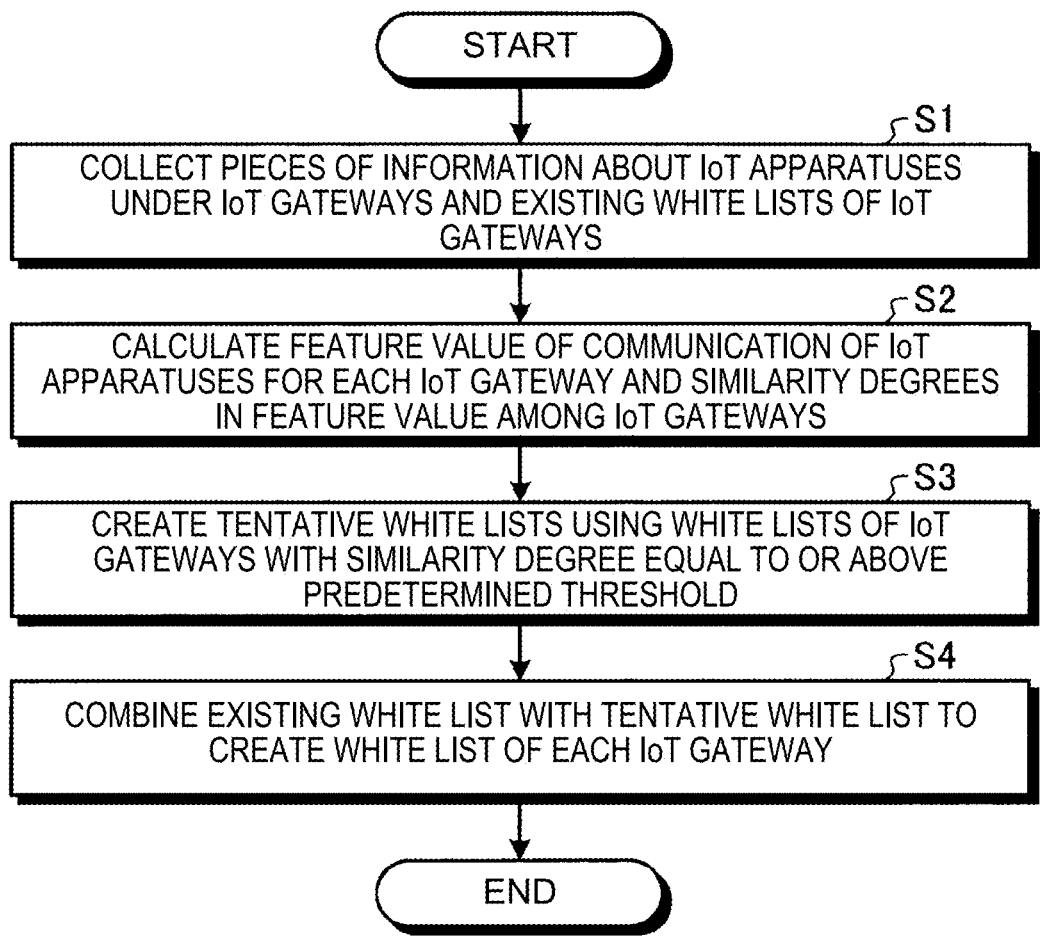
FIG. 6 is a flowchart showing a creation process procedure by the creation device.

[Creation process] FIG. 6 is a flowchart showing a creation process procedure by the creation device 10 according to the present embodiment. The flowchart in FIG. 6 is started, for example, at a timing when a start instruction operation input is given.

First, the collection section 15a collects, from all the IoT gateways 2 connected to the network N, pieces of IoT apparatus information that the IoT gateways 2 regularly collect and existing white lists stored in the IoT gateways 2 (step S1). For example, each of the pieces of IoT apparatus information includes models of IoT apparatuses 3, the number of IoT apparatuses 3 for each model, and features of communication with a corresponding IoT gateway 2.

Next, based on the collected pieces of IoT apparatus information, the calculation section 15b calculates, for each IoT gateway 2, a feature value showing communication features of IoT apparatuses 3 under the IoT gateway 2, and calculates degrees of similarity in the feature value among the IoT gateways 2 (step S2). For example, the calculation section 15b calculates the feature value based on a rate of the number of IoT apparatuses 3 under each IoT gateway 2 for each communication feature.

Next, if any of the calculated similarity degrees is equal to or above a predetermined threshold, the extraction section 15c extracts, from pieces of white list information about IoT apparatuses 3 included in white lists stored in the IoT gateways 2, pieces of white list information about IoT apparatuses 3 to mutually complement white lists. Further, the extraction section 15c creates tentative white lists that include the extracted pieces of white list information for the IoT gateways 2 (step S3).

In other words, in order that pieces of white list information of desired IoT apparatuses 3 become the same among similar IoT gateways 2, the extraction section 15c creates a tentative white list for each of the IoT gateways 2.

Further, the combination section 15d combines the existing white list of each IoT gateway 2 with a tentative white list created by the extraction section 15c to create the latest white list to be applied to the IoT gateway 2 (step S4). Thereby, the continuous creation process ends.

As described above, in the creation device 10 of the present embodiment, the collection section 15a collects pieces of information about the IoT apparatuses 3 connected to the IoT gateways 2, and white lists stored in the IoT gateways 2, the white lists specifying content of communication allowed for each of the IoT apparatuses 3. The calculation section 15b calculates a feature value showing communication features of IoT apparatuses 3 for each of the IoT gateways 2, and degrees of similarity in the feature value among the IoT gateways 2, based on the collected pieces of IoT apparatus information. If any of the calculated similarity degrees is equal to or above a predetermined threshold, the extraction section 15c extracts, from pieces of white list information about IoT apparatuses 3 included in the white lists stored in the IoT gateways 2, pieces of white list information about IoT apparatuses 3 to mutually complement white lists.

Thereby, it is possible to share pieces of white list information about IoT apparatuses 3 that are currently functioning, among such IoT gateways 2 that communication features of IoT apparatuses 3 under the IoT gateways 2 are similar, among all the IoT gateways 2 connected to the network N. Therefore, it becomes possible to apply the latest white list that includes only pieces of white list information about IoT apparatuses 3 that are highly likely to be connected to each IoT gateway 2.

Thus, the creation device 10 can quickly create a white list to be applied to an IoT gateway 2 even during a period of white list creation by machine leaning. Further, by excluding pieces of white information about IoT apparatuses 3 that are unlikely to be connected to an IoT gateway 2, it becomes possible to create a tentative white list for the IoT gateway 2, suppressing a capacity.

For example, the calculation section 15*b* calculates, for each IoT gateway 2, a feature value based on the number of IoT apparatuses 3 for each model and communication features for the model. Further, the calculation section 15*b* calculates the feature value, for example, based on the number of IoT apparatuses 3, communication frequency and capacity for each model. Thereby, it becomes possible to simply indicate communication features of IoT apparatuses 3 under each IoT gateway 2.

The combination section 15*d* combines extracted pieces of white list information with white lists stored in the IoT gateways 2. The combination section 15*d* may be implemented in the creation device 10 or may be implemented in each IoT gateway 2. Thereby, it becomes possible to flexibly configure the system.

[Program] It is also possible to create a program in which the processes executed by the creation device 10 according to the above embodiment are written in a computer-executable language. As one embodiment, the creation device 10 can be implemented by causing a creation program to execute the above creation process to be installed in a desired computer as package software or online software. For example, it is possible to, by causing an information processing device to execute the above creation program, cause the information processing device to function as the creation device 10. As the information processing device stated here, a desktop-type or laptop-type personal computer is included. In addition, as the information processing device, a mobile communication terminal such as a smartphone, a mobile phone and a PHS (personal handyphone system) and, furthermore, a slate terminal such as a PDA (personal digital assistant) is included in the category. Further, the functions of the creation device 10 may be implemented in a cloud server.

Figure 7:
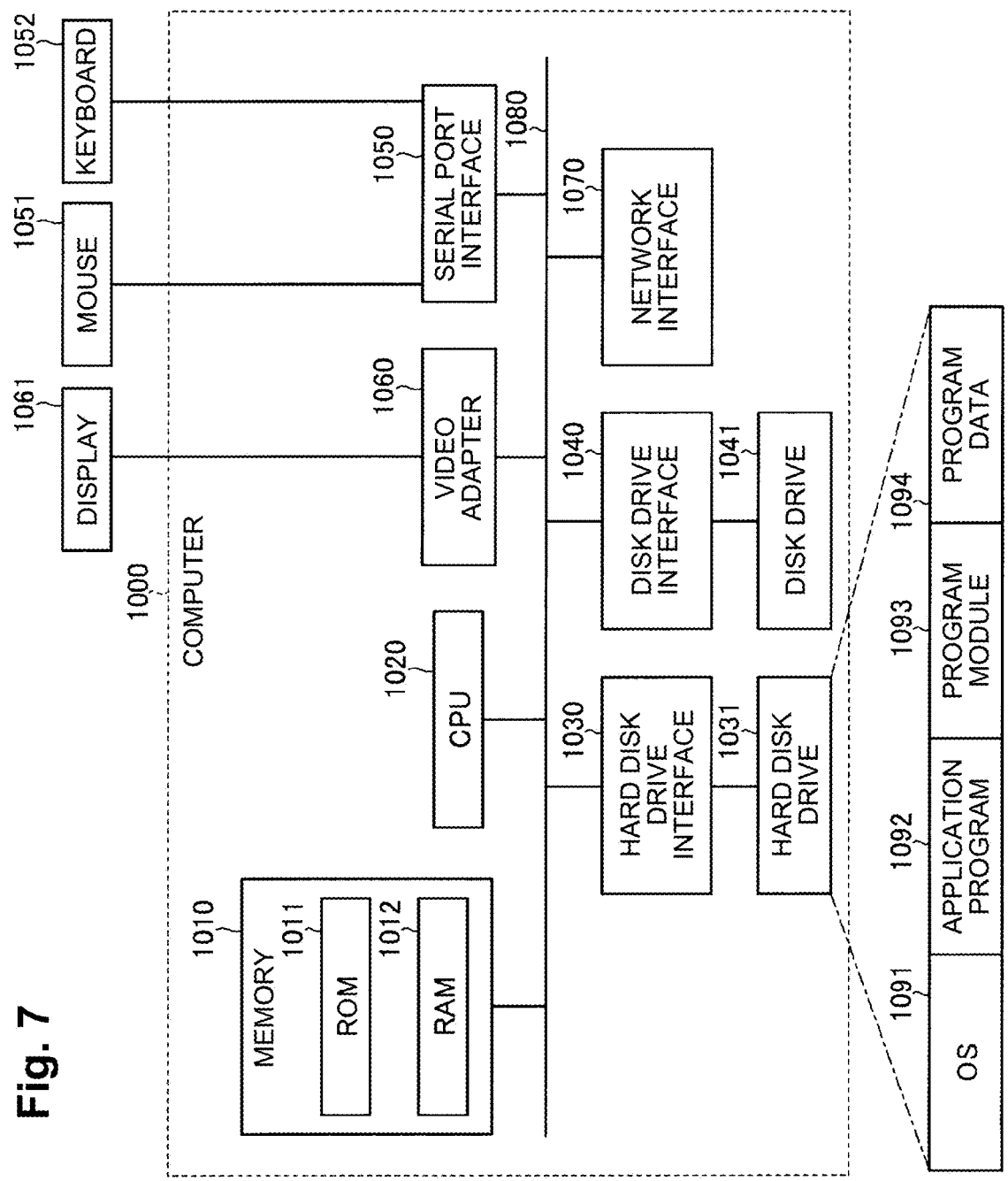
FIG. 7 is a diagram showing an example of a computer to execute a creation program.

FIG. 7 is a diagram showing an example of a computer to execute the creation program. A computer 1000 has, for example, a memory 1010, a CPU 1020, a hard disk drive interface 1030, a disk drive interface 1040, a serial port interface 1050, a video adapter 1060 and a network interface 1070. These units are connected via a bus 1080.

The memory 1010 includes a ROM (read-only memory) 1011 and a RAM 1012. The ROM 1011 stores, for example a boot program such as BIOS (basic input/output system). The hard disk drive interface 1030 is connected to a hard disk drive 1031. The disk drive interface 1040 is connected to a disk drive 1041. For example, a removable storage medium such as a magnetic disk and an optical disk is inserted into the disk drive 1041. To the serial port interface 1050, for example, a mouse 1051 and a keyboard 1052 are connected. To the video adapter 1060, for example, a display 1061 is connected.

Here, the hard disk drive 1031 stores, for example, an OS 1091, an application program 1092, a program module 1093 and program data 1094. Each piece of information described in the above embodiment is stored, for example, in the hard disk drive 1031 or the memory 1010.

Further, the creation program is stored in the hard disk drive 1031, for example, as the program module 1093 in which commands to be executed by the computer 1000 are written. Specifically, the program module 1093 in which each process executed by the creation device 10 described in the above embodiment is written is stored in the hard disk drive 1031.

Data used in information processing by the creation program is stored, for example, in the hard disk drive 1031 as the program data 1094. The CPU 1020 reads the program module 1093 and the program data 1094 stored in the hard disk drive 1031 onto the RAM 1012 as necessary and executes each procedure described above.

The program module 1093 and the program data 1094 related to the creation program are not limited to the case of being stored in the hard disk drive 1031 but may be stored, for example, in a removable storage medium and read out by the CPU 1020 via the disk drive 1041 or the like. Or alternatively, the program module 1093 and the program data 1094 related to the creation program may be stored in another computer connected via a network such as a LAN and a WAN (wide area network) and read out by the CPU 1020 via the network interface 1070.

An embodiment to which an invention made by the inventor is applied has been described above. The present invention, however, is not limited by the description and drawings forming a part of disclosure of the present invention by the present embodiment. In other words, all of other embodiments, examples, operational techniques and the like made by those skilled in the art based on the present embodiment are included in the category of the present invention.

REFERENCE SIGNS LIST

1 Creation system
2 IoT gateway
3 IoT apparatus
10 Creation device
11 Input unit
12 Output unit
13 Communication control unit
14 Storage unit
15 Control unit
15*a* Collection section
15*b* Calculation section
15*c* Extraction section
15*d* Combination section
N Network

The invention claimed is:

1. A creation device comprising:
processing circuitry configured to:
collect pieces of information about IoT (Internet of Things) apparatuses connected to IoT gateways, and white lists stored in the IoT gateways, the white lists specifying content of communication allowed for each of the IoT apparatuses;
calculate a feature value showing communication features of IoT apparatuses for each of the IoT gateways, and degrees of similarity in the feature value among the IoT gateways, based on the collected pieces of information about the IoT apparatuses; and
extract, if any of the calculated similarity degrees is equal to or above a predetermined threshold, pieces of white list information about IoT apparatuses to mutually complement white lists stored in IoT gateways, from pieces of white list information about IoT apparatuses included in the white lists.

2. The creation device according to claim 1, wherein the processing circuits is further configured to calculate, for each of the IoT gateways, the feature value based on the number of IoT apparatuses for each model and communication features for the model.

3. The creation device according to claim 1, wherein the processing circuitry is further configured to calculate the degrees of similarity in the feature value based on a method of calculating degrees of similarity among vectors.

4. The creation device according to claim 1, wherein the processing circuitry is further configured to combine the extracted pieces of white list information with the white lists stored in the IoT gateways.

5. A creation system comprising a creation device and IoT (Internet of Things) gateways, wherein
the creation device includes:
processing circuitry configured to:
collect pieces of information about IoT apparatuses connected to IoT gateways, and white lists stored in the IoT gateways, the white lists specifying content of communication allowed for each of the IoT apparatuses:
calculate a feature value showing communication features of IoT apparatuses for each of the IoT gateways, and degrees of similarity in the feature value among the IoT gateways, based on the collected pieces of information about the IoT apparatuses; and
extract, if any of the calculated similarity degrees is equal to or above a predetermined threshold, pieces of white list information about IoT apparatuses to mutually complement white lists stored in IoT gateways, from pieces of white list information about IoT apparatuses included in the white lists, and
each of the IoT gateways includes processing circuitry configured to combine the extracted pieces of white list information with a white list stored in the IoT gateway.

6. A creation method, the creation method comprising:
collecting pieces of information about IoT (Internet of Things) apparatuses connected to IoT gateways, and white lists stored in the IoT gateways, the white lists specifying content of communication allowed for each of the IoT apparatuses;
calculating a feature value showing communication features of IoT apparatuses for each of the IoT gateways, and degrees of similarity in the feature value among the IoT gateways, based on the collected pieces of information about the IoT apparatuses; and
extracting, if any of the calculated similarity degrees is equal to or above a predetermined threshold, pieces of white list information about IoT apparatuses to mutually complement white lists stored in IoT gateways, from pieces of white list information about IoT apparatuses included in the white lists.

* * * * *